US008510312B1

(12) United States Patent
Thibaux et al.

(10) Patent No.: US 8,510,312 B1
(45) Date of Patent: Aug. 13, 2013

(54) AUTOMATIC METADATA IDENTIFICATION

(75) Inventors: Romain Thibaux, San Francisco, CA (US); Luc Vincent, Palo Alto, CA (US); Christopher Richard Uhlik, Danville, CA (US); Raghavan Manmatha, Belehertown, MA (US); Xuefu Wang, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1043 days.

(21) Appl. No.: 11/864,197

(22) Filed: Sep. 28, 2007

(51) Int. Cl.
*G06F 7/00* (2006.01)
*G06F 17/30* (2006.01)

(52) U.S. Cl.
USPC .......................................................... 707/748

(58) Field of Classification Search
None
See application file for complete search history.

(56) References Cited

U.S. PATENT DOCUMENTS

| | | | |
|---|---|---|---|
| 5,299,026 A | | 3/1994 | Vincett et al. |
| 5,822,083 A * | | 10/1998 | Ito et al. .................... 358/403 |
| 6,044,375 A * | | 3/2000 | Shmueli et al. .................. 1/1 |
| 6,047,291 A | | 4/2000 | Anderson et al. |
| 6,055,543 A | | 4/2000 | Christensen et al. |
| 6,098,034 A * | | 8/2000 | Razin et al. ..................... 704/9 |
| 6,311,214 B1 | | 10/2001 | Rhoads |
| 6,353,822 B1 * | | 3/2002 | Lieberman ...................... 1/1 |
| 6,418,448 B1 | | 7/2002 | Sarkar |
| 6,651,059 B1 | | 11/2003 | Sundaresan et al. |
| 6,859,803 B2 | | 2/2005 | Dagtas et al. |
| 7,099,508 B2 * | | 8/2006 | Yokota ....................... 382/173 |
| 7,113,943 B2 * | | 9/2006 | Bradford et al. .............. 707/4 |
| 7,228,301 B2 * | | 6/2007 | Meyerzon et al. .............. 1/1 |
| 7,646,921 B2 * | | 1/2010 | Vincent et al. .............. 382/225 |
| 7,650,035 B2 * | | 1/2010 | Vincent et al. .............. 382/225 |
| 7,676,463 B2 * | | 3/2010 | Thompson et al. ............... 1/1 |
| 7,697,758 B2 * | | 4/2010 | Vincent et al. .............. 382/177 |
| 7,707,039 B2 * | | 4/2010 | King et al. .................. 382/305 |
| 8,166,045 B1 * | | 4/2012 | Mazumdar et al. .......... 707/748 |
| 2003/0028503 A1 * | | 2/2003 | Giuffrida et al. ............... 707/1 |
| 2004/0199547 A1 * | | 10/2004 | Winter et al. ............... 707/200 |
| 2004/0267721 A1 * | | 12/2004 | Meyerzon et al. .............. 707/3 |
| 2005/0041860 A1 * | | 2/2005 | Jager ............................ 382/173 |
| 2005/0108001 A1 * | | 5/2005 | Aarskog ......................... 704/10 |
| 2006/0023945 A1 * | | 2/2006 | King et al. .................. 382/173 |
| 2006/0143154 A1 * | | 6/2006 | Jager ............................... 707/1 |
| 2007/0067157 A1 * | | 3/2007 | Kaku et al. ..................... 704/10 |
| 2007/0086061 A1 * | | 4/2007 | Robbins ...................... 358/400 |
| 2007/0179937 A1 * | | 8/2007 | Kawamura et al. .............. 707/3 |
| 2007/0198481 A1 * | | 8/2007 | Hogue et al. ................... 707/3 |
| 2007/0240031 A1 * | | 10/2007 | Zhao .......................... 715/501.1 |

(Continued)

OTHER PUBLICATIONS

Hammouda, Phrase-Based Document Similarity Based on an Index Graph, IEEE 2002, pp. 1-8.*

(Continued)

*Primary Examiner* — Uyen Le
(74) *Attorney, Agent, or Firm* — Harrity & Harrity, LLP

(57) ABSTRACT

A system identifies metadata associated with a document by capturing text of a document and comparing the text of the document with a collection of metadata records. Sets of matches between the text of the document and at least one record in the collection of metadata records may be identified, where each set of matches corresponds to a metadata record in the collection of metadata records. Metadata records corresponding to each set of matches may be scored. At least one of the metadata records may be identified based on the scores of the metadata records. The at least one identified metadata record may be associated with the document.

30 Claims, 9 Drawing Sheets

(56) References Cited

U.S. PATENT DOCUMENTS

| | | | | |
|---|---|---|---|---|
| 2007/0279711 | A1* | 12/2007 | King et al. | 358/508 |
| 2007/0300142 | A1* | 12/2007 | King et al. | 715/500 |
| 2008/0077570 | A1* | 3/2008 | Tang et al. | 707/5 |
| 2008/0082426 | A1* | 4/2008 | Gokturk et al. | 705/27 |
| 2008/0154956 | A1* | 6/2008 | DeBie | 707/104.1 |
| 2010/0027834 | A1* | 2/2010 | Spitzig et al. | 382/100 |

OTHER PUBLICATIONS

Ics "MIT Theses Digital Library—History and Development", downloaded from web.mit.edu/ethesis/www/theses-history.html, Sep. 3, 1998.*

Broder, A.Z. "Identifying and Filtering Near-Duplicate Documents", Proceedings of the 11$^{th}$ Annual Symposium on Combinatorial Pattern Matching (CPM 2000), Jun. 21-23, 2000, pp. 1-10.*

Han, H., L. Giles, E. Manavoglu, H. Zha, Z. Zhang and E.A. Fox "Automatic Document Metadata Extraction Using Support Vector Machines", Proceedings of the 2003 Joint Conference on Digital Libraries (JCDL '03), 2003.*

Baird, H.S., D. Lopresti, B.D. Davison and W.M. Pottenger "Robust Document Image Understanding Technologies", Proceedings of the 1st ACM Workshop on Hardcopy Document Processing, Conference on Information and Knowledge Management (HDP '04), Nov. 12, 2004, pp. 9-14.*

Olsen, S. "An Open-Source Rival to Google's Book Project", ZDNet News, Oct. 26, 2005.*

Kawtrakul, A. and C. Yimgsaeree "A Unified Framework for Automatic Metadata Extraction from Electronic Document", Proceedings of the International Advanced Digital Library Conference, Nagoya, Japan, 2005.*

Sankar, K.P., V. Ambati, L. Pratha and C.V. Jawahar "Digitizing a Million Books: Challenges for Document Analysis", Proceedings of the 7$^{th}$ IAPR Workshop on Document Analysis Systems, LNCS 3872, Feb. 13-15, 2006.*

Coyle, K. "Managing Technology: Mass Digitization of Books", The Journal of Academic Librarianship, vol. 32, No. 6, Nov. 2006, pp. 641-645.*

Vincent, L. "Google Book Search: Document Understanding on a Massive Scale", Proceedings of the International Conference on Document Analysis and Recognition (ICDAR 2007), Sep. 2007.*

Fuchun Peng et al.: "Accurate Information Extraction from Research Papers using Conditional Random Fields". Proceedings of Human Language Technology Conference and North American Chapter of the Association for Computational Linguistics, May 2004, 8 pages.

Hui Han et al.: "Automatic Document Metadata Extraction using Support Vector Machines". Proceedings of the 2003 Joint Conference on Digital Libraries, May 2003, 12 pages.

Jongwoo Kim: "Automated Labeling for Biomedical Document Images". Proceedings of 7th World Multiconference on Systemics, Cybernetics and Informatics, Jul. 2003, 6 pages.

Stefan Klink et al.: "Document Structure Analysis Based on Layout and Textual Features". Proceedings DAS2000. Fourth International Workshop on Document Analysis Systems, Dec. 2000, 12 pages.

Co-pending U.S. Appl. No. 10/952,445, entitled "Automatic Maetadata Identification", by M. Lifantsev, filed Sep. 29, 2004, 29 pages.

\* cited by examiner

DOCUMENT COPYRIGHT PAGE

- 910 — PUBLISHED BY ABC PUBLISHING COMPANY, 123 OAKGLEN DRIVE, NEW YORK, NY 10003
- 920 — A WALK IN THE PARK, COPYRIGHT © 1999 BY JOHN SMITH
- 930 — ALL RIGHTS RESERVED
- 940 — LIBRARY OF CONGRESS CATALOGING-IN-PUBLICATION DATA, SMITH, JOHN, A WALK IN THE PARK / JOHN SMITH, INCLUDES BIBLIOGRAPHICAL REFERENCES AND INDEX
- 950 — PRINTED IN THE UNITED STATES

FIG. 9

AUTOMATIC METADATA IDENTIFICATION

BACKGROUND

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is a process of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

It is sometimes useful to associate other information, such as categorization, title, author, publisher, and publication date, with the scanned documents. Currently, skilled researchers manually enter this information based on examining the original document.

SUMMARY

According to one aspect, a method may include capturing text of a document; comparing the text of the document with a collection of metadata records; identifying sets of matches between the text of the document and at least one record in the collection of metadata records, where each set of matches corresponds to a metadata record in the collection of metadata records; scoring the metadata records corresponding to the sets of matches; identifying at least one of the metadata records based on the scores of the metadata records; and associating the at least one identified metadata record with the document.

According to another aspect, a system may include means for capturing a document; means for recognizing text of the document; means for comparing the text of the document to content of metadata records; means for identifying sets of matching phrases between the text of the document and one or more of the metadata records; means for scoring each of the sets of matching phrases; and means for associating at least one selected metadata record from the one or more metadata records with the document based on the scores of the sets of matching phrases.

According to yet another aspect, a system may include a first memory to store metadata as records, a second memory to store text of at least one page of a document, and a processor. The processor may identify sets of matching phrases included in the text of the at least one page of the document and at least one stored metadata record, where each set of matching phrases is associated with a metadata record, score each identified set of matching phrases, select at least one of the metadata records based on the scores of the identified set of matching phrases, and associate the document with the at least one selected metadata record.

According to still another aspect, a computer-readable memory device that stores instructions executable by at least one processor may include one or more instructions for receiving text of a document; one or more instructions for identifying sets of matches between the text of the document and metadata records in a collection of metadata records, where each set of matches corresponds to a metadata record in the collection of metadata records; one or more instructions for scoring each set of matches; one or more instructions for identifying at least one of the metadata records corresponding to a highest scoring set of matches; and one or more instructions for associating the at least one identified metadata record with the document.

BRIEF DESCRIPTION OF THE DRAWINGS

The accompanying drawings, which are incorporated in and constitute a part of this specification, illustrate one or more embodiments and, together with the description, explain these embodiments. In the drawings:

FIG. 9 is a diagram of an exemplary document copyright page.

DETAILED DESCRIPTION

The following detailed description refers to the accompanying drawings. The same reference numbers in different drawings may identify the same or similar elements. Also, the following detailed description does not limit the invention.

Overview

More and more types of documents are becoming searchable via search engines. For example, some documents, such as books, magazines, and/or catalogs, may be scanned and their text recognized via OCR. It is beneficial to understand more about these documents and make this additional information also searchable.

Systems and methods consistent with the aspects described herein may automatically identify metadata associated with a document based on basic metadata (e.g., title, author, publisher, etc.) and create an association between the metadata and the scanned and/or text version of the document, making both the document and its associated metadata searchable. Accordingly, through basic metadata corresponding to a document, various other kinds of additional existing metadata corresponding to the document may be identified and associated with the document.

Exemplary System

Figure 1:
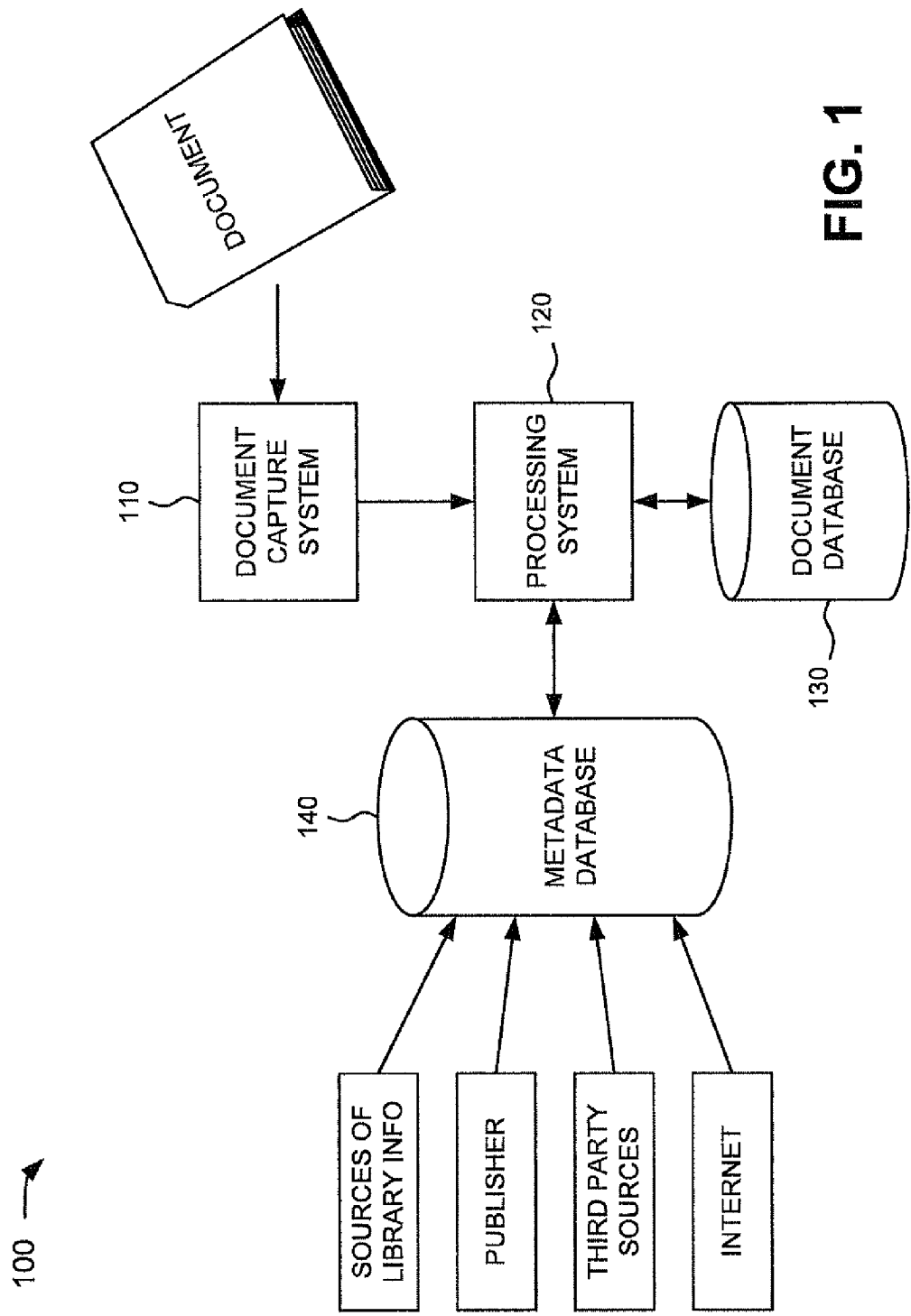
FIG. 1 is a diagram of an exemplary system in which systems and methods consistent with aspects described herein may be implemented.

FIG. 1 is a diagram of an exemplary system 100 in which systems and methods consistent with aspects described herein may be implemented. System 100 may include document capture system 110, processing system 120, document database 130, and metadata database 140. In one implementation, document capture system 110 may scan the pages of a document and perform OCR on one or more of the scanned pages to recognize the text associated with those pages. Document capture system 110 may use any available technique for scanning and performing OCR. A "document," as the term is used herein, is to be broadly interpreted to include any machine-readable and machine-storable work product, electronic media, print media, etc. A document may include, for example, information contained in print media (e.g., newspapers, magazines, books, encyclopedias, etc.), electronic newspapers, electronic books, electronic magazines, online encyclopedias, electronic media (e.g., image files, audio files, video files, web casts, podcasts, etc.), etc.

Processing system 120 may store the scanned image and document text for each of a collection of documents in document database 130. As described in more detail below, processing system 120 may identify metadata in metadata database 140 that corresponds to each document in the collection of documents and link (or otherwise associate) the metadata and the respective documents.

Processing system 120 may include a client entity, where an entity may be defined as a device, such as a personal computer, a wireless telephone, a personal digital assistant (PDA), a laptop, or another type of computation or communication device, a thread or process running on one of these devices, and/or an object executable by one of these devices. In other aspects, processing system 120 may include a server entity that gathers, processes, searches, and/or maintains documents. In such an aspect, a "thin client" device (not shown) may be configured to interact with sever-based processing system 120, where processing of documents may be performed remotely to the client device.

Document database 130 may store the image and text associated with each document in the collection of documents. In one implementation, document database 130 may store OCR text corresponding to a copyright page associated with each scanned document. It should be noted that although a document's copyright page may include the most useful amount and type of information, any document page or combination of document pages useful in identifying the document may be similarly recognized and stored. Additional pages representative of a document's identity may include a title page, a cover page, a book cover, page header information, a book's binding, etc.

Metadata database 140 may store metadata corresponding to documents. Metadata may generally be defined as information obtained separate from the scanning process. The metadata associated with a document may originate from a number of sources, such as sources of library information, a publisher, third party sources, and the Internet. The sources of library information may provide various information regarding a document, such as a title, a list of authors, a list of editors, a publisher, keywords, a number of pages, a subject classification, a publication date, a Library of Congress cataloging number, a digital object identifier (DOI), an International Standard Book Number (ISBN), and/or an International Standard Serial Number (ISSN). Examples of sources of library information may include libraries and organizations, such as the Online Computer Library Center (OCLC) and the Research Libraries Group (RLG). A publisher may also provide information regarding a document, such as the full text of the back cover, the flaps, and/or the table of contents of the document, sales statistics, and/or readership statistics.

Third party sources may provide information regarding a document, such as a first chapter excerpt or other information regarding a document, possibly including information identified above as being provided by the sources of library information or the publisher. Examples of third party sources include Ingram Book Company, Baker and Taylor, and Dial-A-Book (a company that sells excerpts of first chapters of documents). The Internet may be another source of information regarding a document. Information gathered from the Internet regarding a document may include information regarding web documents relating to the document or the author of the document.

Metadata database 140 may store a document's metadata in a record. In one implementation, the records of metadata database 140 are arranged to form a relational database. A key in a relational database is a field or a combination of fields that uniquely identifies a record or reference another record.

In one implementation, document capture system 110, processing system 120, document database 130, and metadata database 140 may be interconnected via any suitable mechanism, such as wired or wireless connections, one or more computer networks (e.g., a local area network (LAN), a wide area network (WAN), a telephone network, such as the Public Switched Telephone Network (PSTN), an intranet, the Internet, or a combination of networks), etc.

Figure 2:
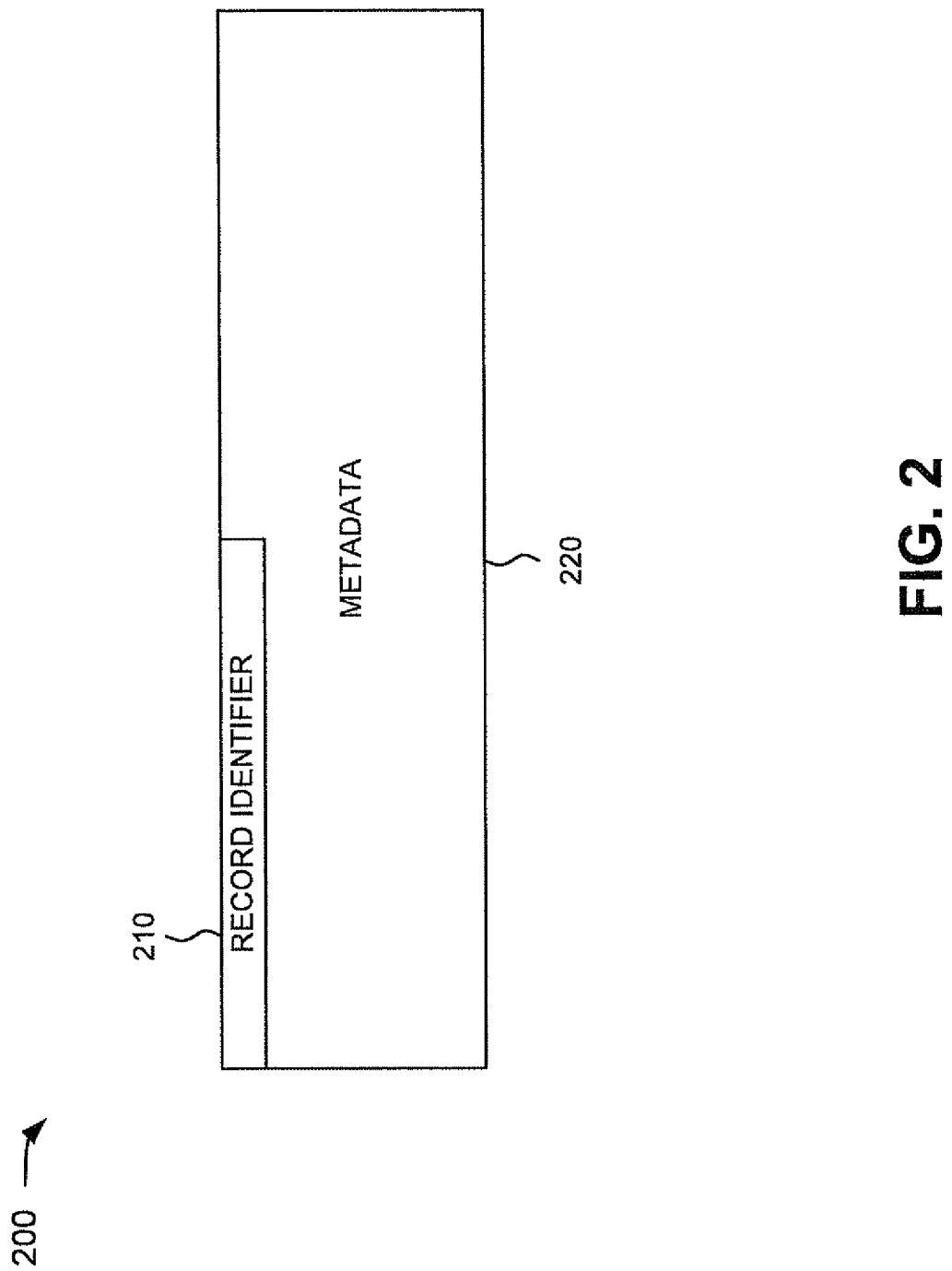
FIG. 2 is a diagram of an exemplary record within the metadata database of FIG. 1.

FIG. 2 is an exemplary diagram of a record 200 within metadata database 140 according to one implementation consistent with aspects described herein. Record 200 may include a number of fields, such as a record identifier field 210 and metadata field(s) 220. Record identifier field 210 may store an identifier corresponding to the record. The record identifier stored in record identifier field 210 may be used by processing system 120 to rank or otherwise organize the records in metadata database 140.

Metadata field(s) 220 may store information, such as the information provided by the various sources described above. In some instances, the information in metadata field(s) 220 may correspond to a single document. In other instances, the information in metadata field(s) 220 may correspond to multiple documents (e.g., documents corresponding to conference proceedings or a series of conference proceedings). In these latter instances, other information, such as a volume number or issue number, may be used to identify metadata associated with a particular document within record 200.

Exemplary Processing System/Scanning System Architecture

Figure 3:
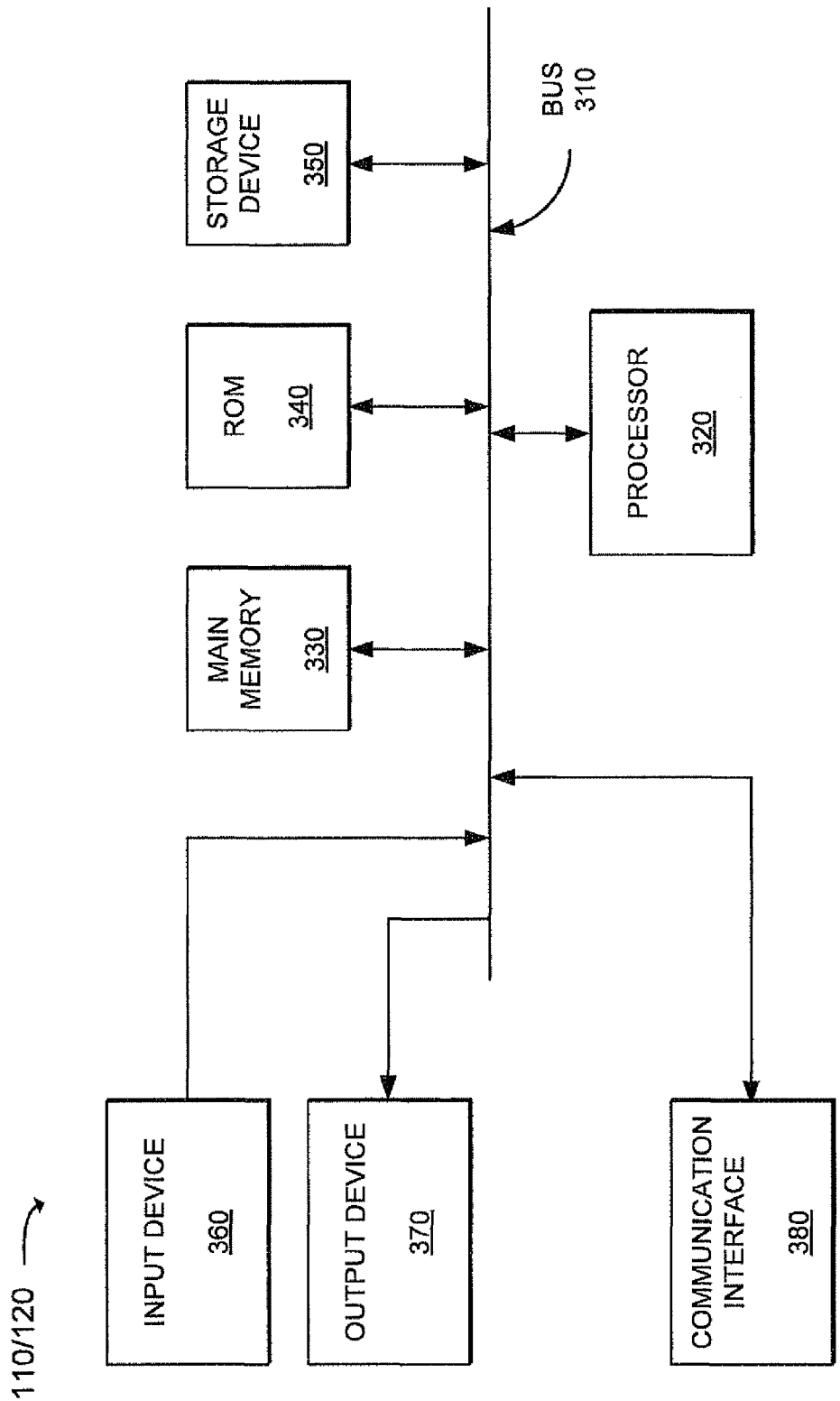
FIG. 3 is a diagram of the exemplary processing system and/or scanning system of FIG. 1.

FIG. 3 is a diagram of exemplary components of processing system 120 and/or document capture system 110 ("system 110/120"). In this implementation, system 110/120 may take the form of a computer. In another implementation, system 110/120 may include a set of cooperating computers.

As shown in FIG. 3, system 110/120 may include a bus 310, a processor 320, a main memory 330, a read only memory (ROM) 340, a storage device 350, an input device 360, an output device 370, and a communication interface 380. Bus 310 may include a path that permits communication among the elements of system 110/120.

Processor 320 may include a processor, microprocessor, or processing logic that may interpret and execute instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include a mechanism that permits an operator to input information to system 110/120, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables system 110/120 to communicate with other devices and/or systems.

As will be described in detail below, system 110/120 may perform certain document processing-related operations. System 110/120 may perform these operations in response to processor 320 executing software instructions contained in a computer-readable medium, such as memory 330. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes in various aspects of the invention. Thus, implementations of the invention are not limited to any specific combination of hardware circuitry and software.

Exemplary Processing

FIGS. 4-8 are flowcharts illustrating exemplary processes for identifying metadata and associating the metadata with a document. The processes of FIGS. 4-8 may be performed by one or more software and/or hardware components within document capture system 110 or processing system 120, or a combination thereof. In another implementation, the processes may be performed by one or more software and/or hardware components within another device or a group of devices separate from or including document capture system 110 and/or processing system 120.

Figure 4:
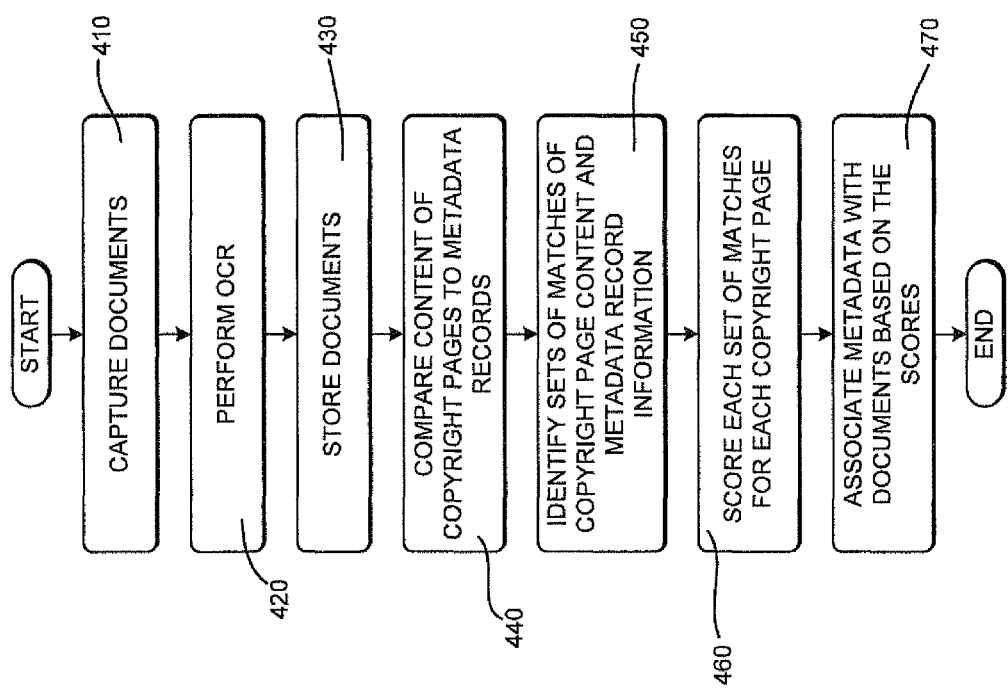
FIGS. 4, 5, 6, 7, and 8 are flowcharts of exemplary processes for identifying metadata and associating the metadata with a document.

The process of FIG. 4 may begin with the capturing of a document (block 410) (FIG. 4). Various scanning techniques may be used to capture images of the pages of the document. Alternatively, images associated with the document may be received from other sources, such as a database of previously scanned documents, third party sources, etc. OCR may then be performed on the images of the pages of the document (block 420). OCR techniques may be used to recognize the text in the document, characteristics of the text (e.g., font, size, etc.), and where the text lies on the pages based on the images of the pages of the document. The document images and/or text may then be stored in document database 130 and/or metadata database 140 (block 430).

In one implementation, recognized content of a copyright page associated with a scanned document may be statistically compared to content of bibliographic metadata records stored in metadata database 140 (block 440). FIG. 9 is an exemplary diagram of a document copyright page. The copyright page typically includes information regarding the publisher of the document 910, the title, copyright date, and author of the document 920, a statement of rights regarding the document 930, Library of Congress data 940, and a location of printing 950. Other copyright pages might include more, fewer, or different pieces of information.

To identify the copyright page of a document, the first several pages of the document may be analyzed. In one implementation, the first several pages of the document may be searched for the presence of a certain keyword, or keywords, that is indicative of the copyright page, such as "Library of Congress," "ISBN," or "ISSN." Alternatively or additionally, the pages may be searched for other information that is indicative of the copyright page, such as the copyright symbol (©), typical phrases of copyright statements, a "printed in" clause, or the presence of a date.

Returning to FIG. 4, the comparison may result in a number of sets of matching words or phrases associated with or found within a selected copyright page (block 450), where each set of matches corresponds to a metadata record having one or more words or phrases contained within the selected copyright page. It should be noted that, in one implementation, sets of matches may be identified for each copyright page recognized or otherwise received in block 420. Additional details regarding the comparison and identification of the sets of matches will be set forth in detail below with respect to FIG. 5.

Once sets of matches have been identified for at least the selected copyright page, the sets of matches may be scored to reflect a measure of similarity between the copyright page and each metadata record corresponding to the sets of matches (block 460). In one implementation, the sets of matches may be scored based on relative probabilities of finding each matching term randomly in both a collection of captured copyright pages and a collection of bibliographic metadata records. Additional details regarding the scoring of sets of matches will be set forth in detail below with respect to FIG. 6.

Once each matching metadata record (as represented by a set of matches) has been scored, the metadata information contained within a highest scoring record may be associated with or linked to the document associated with the selected copyright page (block 470). For example, the captured document may be stored along with a link to the highest scoring metadata record. Similarly, the metadata record may be modified to include a link to the captured document. Alternatively, content of the captured document and the highest scoring metadata record may be combined in an index that may be subsequently searchable via a suitable mechanism, such as a search engine. In other implementations, more than one metadata record may be associated with the document. For example, the document may have associated metadata records in a number of different databases or catalogs. In this implementation, each matching or highest scoring record may be associated with the document. Once the metadata information has been associated with a document (including, for example, the document's image and/or text), all of the information may be available to users for keyword searching and result presentation and to other processes that can now benefit from the availability of structured metadata for the document.

By providing a statistical basis for scoring metadata records that include matching terms to those found on a document's copyright page, metadata associated with the document may be automatically identified and assigned to the document, without requiring specific or unique document identifiers, format, languages, etc.

Figure 5:
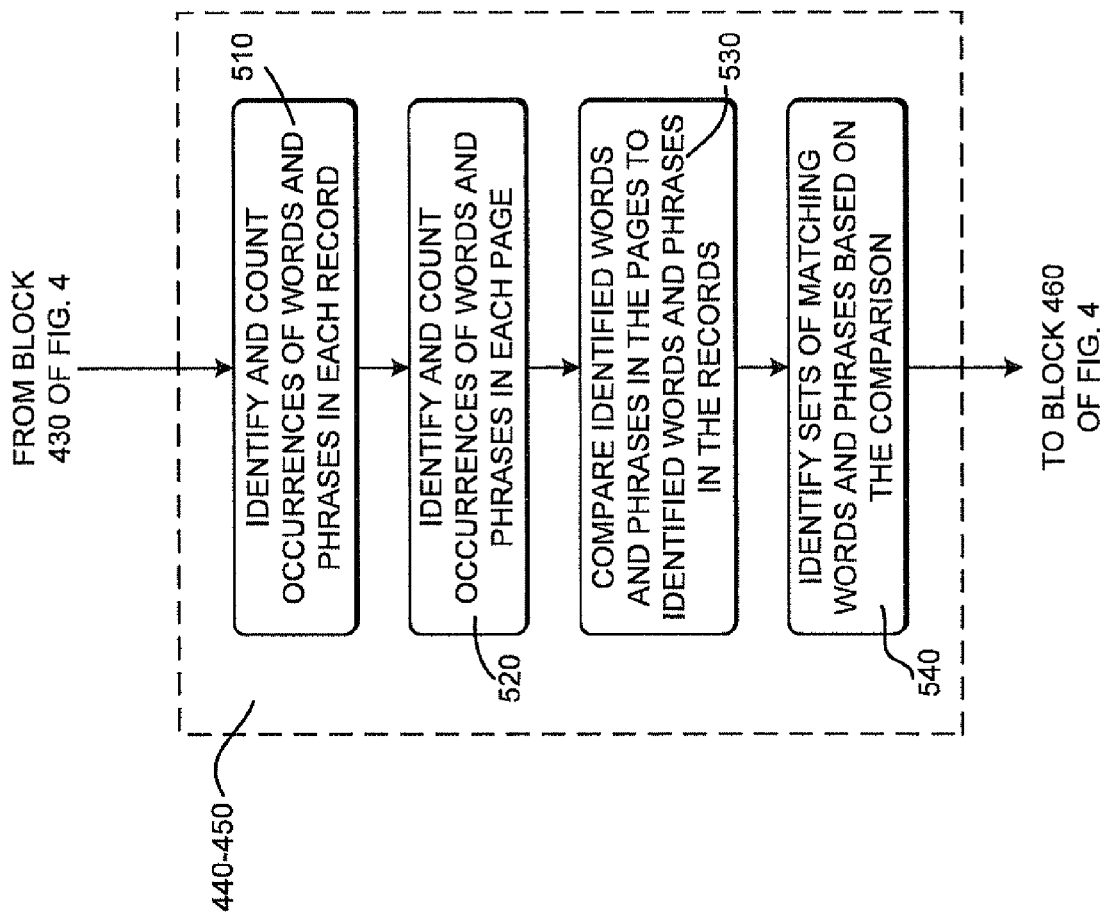

FIG. 5 is a flowchart illustrating detailed processing for comparing a selected copyright page of a document to metadata records and identifying sets of matching records for the selected copyright page. The processing of FIG. 5 may replace or add to similar processing described above with respect to blocks 440 and 450 of FIG. 4. The processing may begin with identifying occurrences of words and phrases (i.e., combinations of words) found in the metadata records (block 510). Similarly, occurrences of words and phrases found in the selected copyright page may be identified (block 520). In one implementation, common OCR substitutions (e.g., replacing the word "thc" with "the", etc.) may be dynamically added into the recognized copyright pages for the purpose of metadata identification, thereby potentially increasing the number of accurately recognized words and phrases associated with the copyright page. Such inclusion may prevent OCR errors from overly impacting document analysis. The identified words and phrases in the records and the identified words and phrases in the selected copyright page may be compared to each other (block 530) and sets of matching words and phrases may be generated based on the comparison (block 540). Each set of matching words and phrases may correspond to one matching record.

Figure 6:
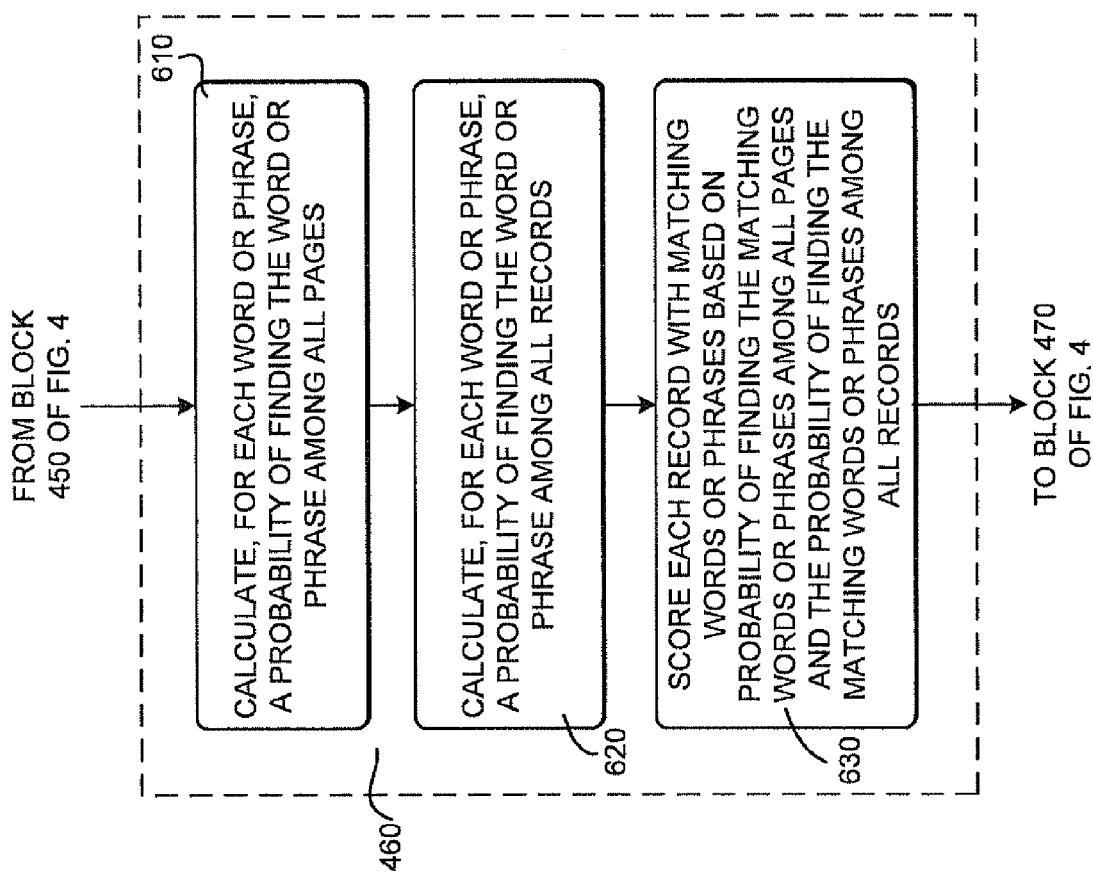

FIG. 6 is a flowchart illustrating detailed processing for scoring the sets of matches. The processing of FIG. 6 may replace or add to similar processing described above with respect to block 460 of FIG. 4. The processing may begin with calculating, for each word or phrase in the selected copyright page, a probability of finding the word or phrase among all copyright pages in the collection of documents stored in document database 130 (block 610). In one implementation, such a probability may be expressed as p(w), where w represents an individual word or phrase. Similarly, a probability of finding each word or phrase in the selected copyright page among all metadata records may be calculated for each word or phrase (block 620). In one implementation, this probability may be expressed as q(w).

In one exemplary implementation, the probability p(w) may be defined as:

$$p(w) = \begin{cases} nw/(n+1), & \text{when } nw > 0 \\ 1/(n+1) & \text{when } nw = 0 \end{cases},$$

where nw is a count of occurrences of the phrase or word (or phrase) w among all copyright pages in the collection of documents and n represents the total number of copyright pages in the collection of documents. It should be noted that the above expression accounts for words or phrases that may be found in the collection of metadata records but not in the collection of documents by reserving one count for unknown words (e.g., nw=0).

The probability q(w) may be defined as:

$$q(w) \approx \begin{cases} Nw/(N+1), & \text{when } Nw > 0 \\ 1/(N+1) & \text{when } Nw = 0 \end{cases},$$

where Nw is a count of occurrences of the phrase or word (or phrase) w among all metadata records in the collection of metadata records and N represents the total number of metadata records in the collection of metadata records. It should be noted that the above expression accounts for words or phrases that may be found in the collection of documents but not in the collection of metadata records by reserving one count for unknown words (e.g., Nw=0). It should be noted that other methods of smoothing or accounting for unknown words may be used, such as Good Turing or absolute discounting.

Once the probabilities associated with the words or phrases in the sets of matching words or phrases have been calculated, a score for each set of matching words or phrases may be generated based on the probabilities (block 630). In one implementation, a score for a set of matches M may be defined as:

$$S(M) = -\sum_{w \text{ in } M} (\log(p(w)) + \log(q(w))),$$

This expression may be further defined in terms of the product of the probabilities p(w) and q(w):

$$S(M) = -\log\left[\prod_w^M (p(w) * q(w))\right]$$

where $$\prod_w^M (p(w) * q(w))$$

represents the combined product of p(w)×q(w) for each word in the set M. This product defines the probability P of observing at least the set of matches M among all copyright pages and metadata records. The probability P assumes that the words in the copyright pages and the metadata records are allocated independently and at random. Accordingly, for each probability P, a high value represents a less likely random occurrence and a higher likelihood that the two records (e.g., the copyright page and the metadata record) are in fact related to each other or that the metadata record relates to the matching copyright page.

This operation sums the log of the probability of finding each term in the set of matches in a random copyright page with the log of the probability of finding each term in the set of matches in a random metadata record. By using logarithms of the probabilities rather than the probabilities themselves, the scale of the scoring may be expanded. Furthermore, by using the probabilities of finding the matching words in both the collection of documents and the collection of metadata records, the contribution based on matches of more statistically rare terms is larger. Consider the following example including a set of matches may include three words or phrases $w_1$, $w_2$, and $w_3$ having probabilities $p(w_1)$, $p(w_2)$, $p(w_3)$, respectively and $q(w_1)$, $q(w_2)$, $q(w_3)$, respectively relating to finding a match in the collection of documents and the collection of metadata records. Assume the following values of these probabilities:

| Term | $p(w_x)$ | $q(w_x)$ | $\log(p(w_x))$ | $\log(q(w_x))$ |
|---|---|---|---|---|
| $w_1$ | 0.712 | 0.584 | −0.148 | −0.234 |
| $w_2$ | 0.213 | 0.154 | −0.672 | −0.812 |
| $w_3$ | 0.00005 | 0.0025 | −4.301 | −2.602 |

For this example, the score S(M) may be calculated as:

$$S(M) = -\sum_{w_x} (\log(p(w_x)) + \log(q(w_x)))$$
$$= -(-0.148 - 0.234) + (-0.672 - 0.812) + (-4.301 - 2.602)$$
$$= 8.473$$

As calculated, the contribution of word $w_3$, which has a much lower probability of occurring in both the collection of documents and the collection of metadata records, accounts for approximately 80% of the resulting score. Once computed for each set of matches between a copyright page and the metadata records, the scores may be used to rank the matching records. Information associated with one or more of the metadata records may be associated with the document relating to the copyright page based on the ranking. In an alternative implementation, the score S(M) may be calculated based on other functions of the probabilities p and q.

In one implementation, a matching record's score may take into account the fact that the metadata record includes specific fields or groups of information (e.g., author, title, publisher, etc.). In this implementation, a match on each type of information may be weighted differently. For example, a match on the title may be considered more important than a match on the author, even after taking into account the fact that the title is more rare than the author.

Alternatively, matching words and phrases may be weighed differently depending on where they appear on the page. For example, author names often appear in the cataloging-in-publication data may be provided near the bottom of the metadata record. Cataloging-in-publication (CIP) data includes document data prepared by a national library for the country where the document was published (e.g., the Library of Congress). In this example, a score of a match may be increased if the match occurs near the bottom of the metadata record.

Figure 7:
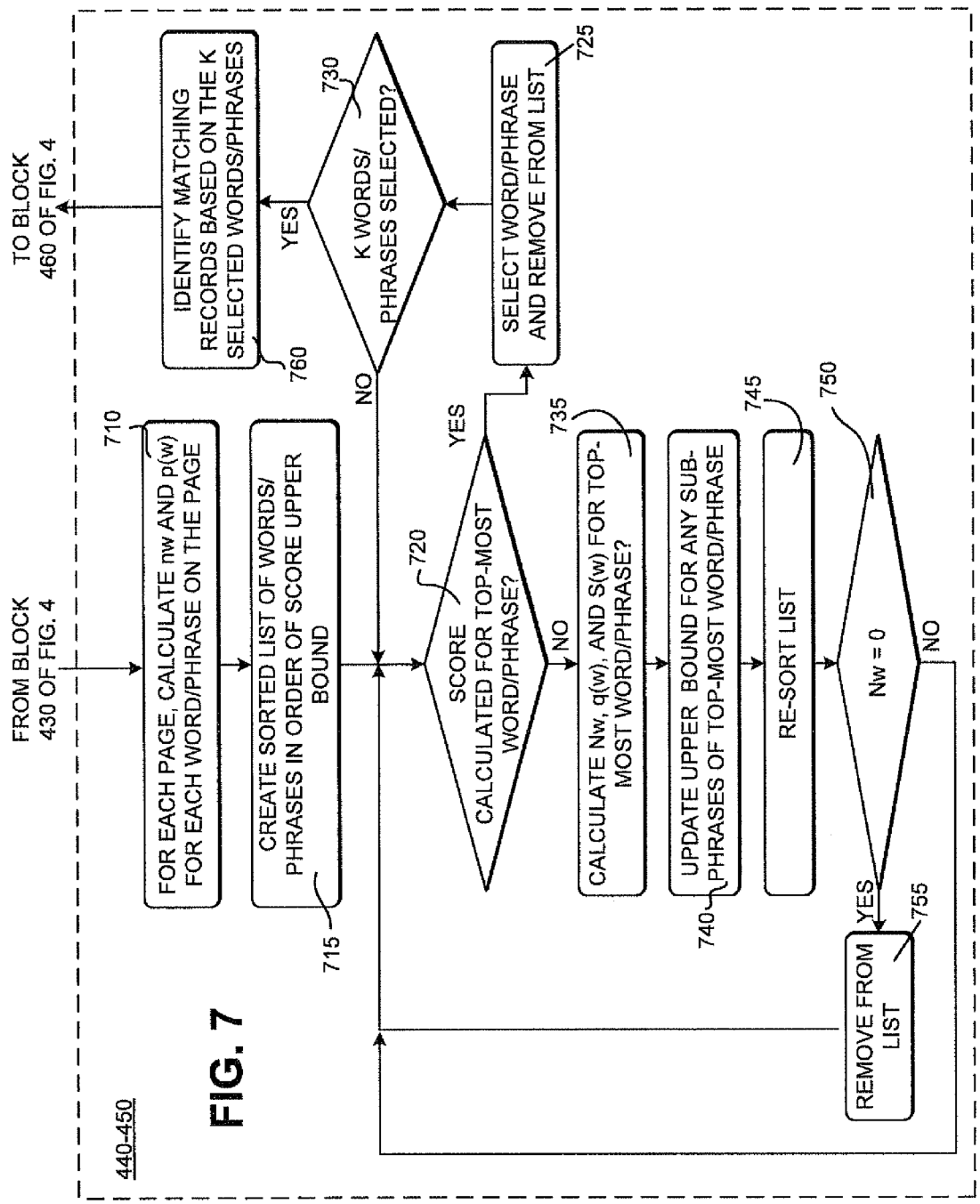

FIG. 7 is a flowchart illustrating detailed processing for selecting the most informative words or phrases in a copyright page and scoring the matches for those phrases. The processing of FIG. 7 may replace or add to similar processing described above with respect to blocks 440 and 450 of FIG. 4 and following block 620 of FIG. 6. The processing may begin with calculating, for each word or phrase in a selected copyright page, a count nw and a probability p(w). In one implementation, these values may be retrieved from a storage or memory when the values had been previously calculated, such as during processing of prior copyright pages. As described above, the count nw may include a count of all occurrences of a phrase in the collection of documents, and the probability p(w) may indicate how likely it is to find that phrase in a randomly selected copyright page.

Next, based on the calculated count nw and probability p(w), a list of words and phrases found in the selected copyright page may be sorted based on a score upper bound (block 715). As derived from the scoring method described above for a set of matching words or phrases, a score associated with a individual word or phrase may be defined as:

$$S(w) = -(\log(p(w)) + \log(q(w)))$$

In one implementation, an upper bound associated with a word or phrase's score may be defined as the highest score obtainable for that word or phrase given the word or phrase's p(w), regardless of the value of Nw (and consequently its probability q(w)). Based on this convention, a word or phrase's score upper bound may be expressed as:

$$S(w) \leq -\log(p(w)) - \log(1/N+1),$$

where log(1/N+1) defines a maximum possible contribution to the score based on the collection of metadata records. That is, this value reflects the contribution of a word or phrase that appears only once in the entire collection of metadata records. By setting the contribution of the metadata records to a maximum, an upper bound for the word or phrase's score may be generated based solely on the contribution of the collection of documents. By sorting the scores of the words or phrases found in the selected copyright page based on the upper bound, unnecessary queries relating to the collection of metadata records may be minimized, thereby enhancing the performance of the scoring method.

In one implementation, sub-phrases or words fully included within parent phrases may be assigned an upper bound based on the contribution of the collection of metadata records to the score of the parent phrase. In other words, the maximum possible contribution to the score of a sub-phrase based on the collection of metadata records may be limited by the actual contribution to the score of the parent phrase based on the collection of metadata records. This relationship may be defined as:

$$S(w) \leq -\log(p(w)) - \log(q(W)),$$

where w represents the sub-phrase and W represents the parent phrase. Note that the contribution of $-\log(q(w))$ will not be larger than that of $-\log(q(W))$ when w is included within W, since the occurrences of sub-phrase w will always be equal to or greater than occurrences of parent phrase W in the collection of metadata records. By restricting upper bound score for the sub-phrase based on the parent phrase, a more accurate estimated score may be calculated as the score upper bound, resulting in more accurate placement into the list of words and phrases.

It should be noted that phrases already scored during prior processing may have their upper bound set to the calculated score. For these terms, additional database queries for the collection of metadata records are not required and sorting based on these known scores may be accurately performed.

Once sorted based on the score upper bound (or score, if a score for the word or phrase has already been calculated), it may be determined whether a score for the top-most word or phrase in the list has been calculated (block 720). If the word or phrase's score has been calculated (block 720—YES), the word or phrase may be selected as an informative word or phrase and the word or phrase may be removed from the list (block 725). It is then determined whether K phrases have been selected from the list (block 730). In one implementation, the present method may be used to select a particular number of informative words or phrases from among the words and phrases on the selected copyright page. In one exemplary embodiment, this number K may be approximately 50. In another implementation, the value of K may be dynamic, increasing until a clear best candidate matching record is identified. For example, a first number of informative words or phrases may be processed and the resulting scores generated. For maximum scores not meeting a particular threshold, additional informative words or phrases may be added, resulting in potentially increased scores for matching records.

If it is determined that K phrases have not been selected (block 730—NO), the process goes to block 720 for a determination of whether the new top-most word or phrase has been fully scored. If it is determined that the top-most word or phrase has not been scored (block 720—NO), the collection of metadata records may be queried for a count Nw relating to the top-most word or phrase, a probability q(w) for the top-most word or phrase may be calculated based on the count Nw, and a score S(w) for the phrase may be calculated based on the previously generated probability p(w) and the newly calculated probability q(w) in the manner described in detail above (block 735).

Any sub-phrases included in the word or phrase w may be identified and their upper bounds may be adjusted based on the values of q(w) for parent phrase w (block 740). The list of remaining words and phrases may then be re-sorted based on the calculated score S(w) and the new upper bounds for any included sub-phrases (block 745). Next, it may be determined whether the count Nw for the word or phrase w is equal to zero (block 750). If count Nw is equal to zero, thus indicating that the word or phrase w is not found in the collection of metadata records (block 750—YES), the word or phrase w may be removed from the list (block 755) and processing may return to block 720 for a determination of whether the top-most word or phrase of the newly re-sorted list has been fully scored. If count Nw is not equal to zero (block 750—NO), processing returns to block 720 without removing the word or phrase w.

Returning to block 730, if it is determined that K words or phrases have been selected (block 730—YES), a number of sets of matching words or phrases associated with one or more of the K words or phrases may be identified (block 760), where each set of matches corresponds to a metadata record having one or more words or phrases contained within the K words or phrases. Processing may then continue to block 460 of FIG. 4 described in detail above.

By facilitating the selecting of only the K most informative words or phrases from within the selected copyright page, queries of the collection of metadata records relating to counts for less informative words or phrases are reduced, thereby increasing the speed and performance of the metadata identification operation.

Figure 8:
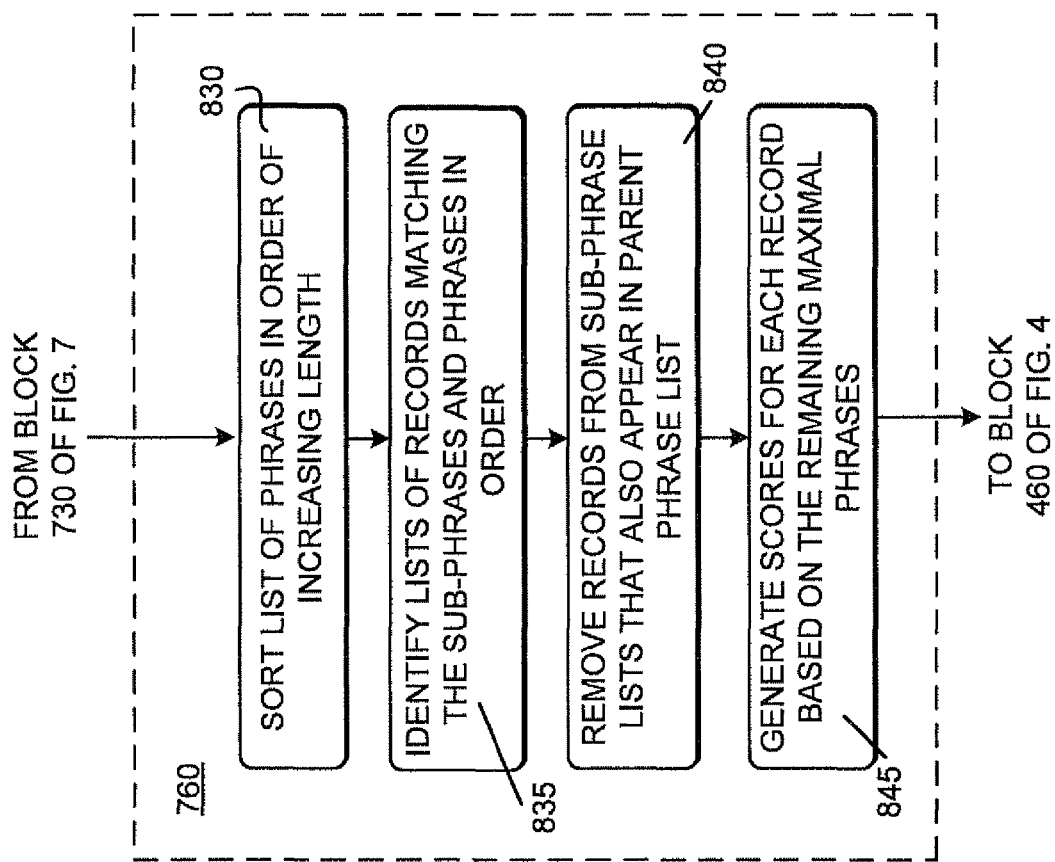

FIG. 8 is a flowchart illustrating detailed processing for reducing the cumulative effect of matching sub-phrases of already matching parent phrases. The processing of FIG. 8 may replace or add to similar processing described above with respect to block 460 of FIG. 4. The processing may begin by sorting the phrases or words in each set of matches in order of increasing length, such that sub-phrases are listed ahead of their parent phrase (block 830). For example, consider the phrases "John", "John Wiley", "John Wiley &", "John Wiley & Sons", "Wiley", "Wiley &", "Wiley & Sons", "&", "& Sons", and "Sons." In this example, these phrases would be listed as:

| |
|---|
| John |
| Wiley |
| John Wiley |
| & |
| Wiley & |
| John Wiley & |
| Sons |
| & Sons |
| Wiley & Sons |
| John Wiley & Sons |

Next, lists of metadata records matching each phrase may be generated in order of the position of the phrases on the list (block 835). For the above example, a list of records matching the phrase "John" may be first generated, followed by a list of records matching the phrase "John Wiley". Each list generated may include a pointer or identifier that references a record in the collection of metadata records. Generation of the lists may be facilitated by the creation of an inverted index linking terms or phrases to each record in which those terms and phrases are found. For the above example, the first two lists may be represented as:

| Matches for "John" | Matches for "Wiley" | Matches for "John Wiley" |
|---|---|---|
| A21 | A24 | A24 |
| A24 | A38 | A38 |
| A38 | A41 | A122 |
| A99 | A57 | |
| A109 | A101 | |
| A122 | A122 | |
| A134 | A179 | |
| A167 | A208 | |

Upon generation of a list based on a parent phrase for a previously obtained list of records corresponding to its sub-phrase (such as the list of matches for "John Wiley" following generation of the list of matches for "John"), the records identified in the list relating to the parent phrase that also appear in a list relating to a sub-phrase of the parent phrase may be removed (block 840). For the above example, the parent phrase list includes records A24, A38, and A122. Accordingly, records A24, A38, and A122 would be removed from the list of matches associated with the phrase "John" and the list of matches associated with the phrase "Wiley". Once the contribution of each sub-phrase in a matching record is removed, only maximal matches remain and the set of matches associated with each record may be scored based on the remaining sets of maximal matching phrases for each record (block 845).

For purposes of explanation, assume that a copyright page includes the phrase "John Wiley". Based on the lists identified above, in a non-maximal match scenario, record A24, which matches the entire phrase, may be scored in the manner described above based on the relative contribution of each of the phrases "John", "Wiley", and "John Wiley". Such a scenario may exaggerate the contribution of this one matching phrase by accumulating the contribution of each of the phrases. Consistent with aspects described herein, removal of record A24 for each list associated with an identified sub-phrase (e.g., the list of "John" and the list for "Wiley"), scoring of record A24 may be performed based only on the contribution of the parent phrase.

Consistent with aspects described herein, it should be noted that the above-described embodiments for automatically identifying metadata associated with a document may be performed equally well for documents and records in a number of different languages. For example, compare the score S(M) given to a set M of matches on French phrases in the following two situations: (1) where the collection of documents and the collection of metadata records are all in French, and (2) where the collections of documents and the collections of metadata records are provided in additional languages other than French so that only a fraction 1/r of the documents in the collection of documents and records in the collection of metadata records are in French. Further, let $p_1(w)$ and $p_2(w)$ represent the relative probabilities that a phrase w in the set of matches M occurs in a copyright page in each of these two situations. In this example, $p_2(w)=p_1(w)/r$. Similarly, let $q_1(w)$ and $q_2(w)$ represent the relative probabilities that a phrase w in the set of matches M occurs in a metadata record in each of these two situations. This results in $q_2(w)=q_1(w)/r$.

Using the methodology described in detail above, it can be seen that the scores of the sets of matches M in the two situations are related as $S_2(M)=S_1(M)+2*\log(r)$. The two scores are equal up to an additive constant of $2*\log(r)$. Accordingly, any ranking of records based on these values is identical in the two situations. For the purpose of ranking bibliographic metadata records, the partitioning of books into different languages has no impact, and performance equals that of the single-language case.

In an alternative implementation, a new hidden variable may be introduced relating to the language of the document. The above-described analysis may then be performed for each possible language given that the probabilities associated with words and phrases may vary depending on the language (for instance "the" is more likely to occur in English than in Spanish). In this implementation, a posterior probability of the language may then be computed by calculating a matching record's score conditionally for each possible language, multiplying by the prior probabilities over languages and renormalizing.

CONCLUSION

Systems and methods consistent with the aspects described herein may automatically identify metadata associated with a document and create an association between the metadata and the image and/or text version of the document, making both the document content and its associated metadata available for searching or other processing. By increasing the quantity of accurate metadata information associated with or linked to a document, the document may be more accurately identified and retrieved in response to subsequent search queries.

The foregoing description of preferred embodiments provides illustration and description, but is not intended to be exhaustive or to limit the invention to the precise form disclosed. Modifications and variations are possible in light of the above teachings or may be acquired from practice of the invention. For example, depending on tradeoffs between speed, database utilization, and/or network bandwidth, various optimizations may be performed, including caching for common word/phrase queries; providing a small local version of metadata database 140 to answer count queries only, but that does not contain the metadata records themselves; or operating the scoring analysis inside the database itself so that it executes as a special query.

Although the above-described embodiments refer to identifying metadata information based on the content of a document's copyright page, other embodiments consistent with aspects described herein may be realized where a content of a first group of documents may be associated with or matched to content of a second group of documents. For example, pages may be matched to entries in a table of contents, pages or document content may be matched to other documents (e.g., cited references), or document pages may be matched to other document pages for detection of duplicate pages. This latter embodiment may be particularly useful where two populations of documents are the same but even identical pages may not match perfectly due to different OCR or processing errors. In still an additional embodiment, web documents may be matched to copyrighted words, thereby assisting in the identification or detection of copyright infringement.

For example, while series of blocks have been described with regard to FIGS. 4-8, the order of the blocks may be modified in other implementations. Further, non-dependent blocks may be performed in parallel. Further, the blocks may be modified in other ways.

It will be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more processors associated with one or more network devices, the method comprising:

capturing text of a document;

comparing the text of the document to content of each of a plurality of metadata records, each of the plurality of metadata records storing information associated with a particular one of a plurality of documents that differs from the document;

selecting, based on comparing the text of the document to the content, one or more of the plurality of metadata records, where, for each of the selected metadata records, a portion of the associated content corresponds to at least a portion of the text of the document;

scoring each of the selected metadata records, including calculating a score representing a correspondence between the text of the document and the content of the respective one of the selected metadata records, where scoring each of the selected metadata records further includes:

calculating a first probability associated with a likelihood of one or more common phrases, that appear in both the text of the document and the content of the one of the selected metadata records, also appearing in the contents of the plurality of metadata records, calculating a second probability associated with a likelihood of the one or more common phrases appearing in text of the plurality of documents, and scoring the one of the selected metadata records based on the first probability and second probability;

ranking the selected metadata records based on scoring the selected metadata records; and storing an association between the document and a particular number of highest ranking ones of the selected metadata records.

2. The method of claim 1, where capturing the text includes:

capturing an image of the document, and converting the image to the text.

3. The method of claim 1, where comparing the text of the document to the content of each of the plurality of metadata records includes:

identifying a copyright page included in the text of the document; and statistically comparing text of the identified copyright page to the content of each of the plurality of metadata records, and where, for one of the selected metadata records, at least a portion of the text of the copyright page corresponds to at least a portion of the content of the one of the selected metadata records.

4. The method of claim 1, where comparing the text of the document to the content of each of the plurality of metadata records comprises:

identifying phrases in the text of the document, where each of the phrases includes one or more words; and comparing the identified phrases, in the text of the document, to the content of each of the plurality of metadata records.

5. The method of claim 4, where selecting the one or more of the plurality of metadata records further comprises:
forming, for each of the selected metadata records, a first list that includes the one or more of the phrases corresponding to the content of the one of the selected metadata records.

6. The method of claim 5, where scoring the selected metadata records further comprises:
counting occurrences, of each of the identified phrases, in the plurality of documents;
counting occurrences, of each of the identified phrases, in the plurality of metadata records;
calculating, for each of the identified phrases and as the first probability, a probability of finding the one of the identified phrases in a randomly selected one of the plurality of documents based on counting the occurrences, of each of the identified phrases, in the plurality of documents;
calculating, for each of the identified phrases and as the second probability, a probability of finding the one of the identified words and phrases in a randomly selected one of the plurality of metadata records based on counting the occurrences, of each of the identified phrases, in the plurality of metadata records; and
scoring the first list for each of the selected metadata records based on the calculated first probability and the second probability.

7. The method of claim 6, where scoring the first set for each of the selected metadata records further comprises:
summing logarithms of the calculated probabilities of finding each of the phrases in the first set.

8. The method of claim 5, where identifying the first set for each of the selected metadata records further comprises:
identifying a maximal matching phrases set occurring for each of the selected metadata records, where the maximal matching phrases set includes entries in the first set that do not include phrases that are included within other entries in the first set; and
scoring the maximal matching phrases set occurring for each of the selected metadata records.

9. The method of claim 8, where identifying the maximal matching phrases set further comprises:
generating a list of phrases in the first set;
sorting the generated list of phrases in order of increasing length, such that a sub-phrase, that includes one or more words, is listed before a parent phrase that includes the sub-phrase and one or more additional words that are not included in the sub-phrase;
generating a first list of records that include the sub-phrase;
generating a second list of records that include the parent phrase;
removing, from the first list of records that include the sub-phrase, the records that are included in the second list of records that include the parent phrase; and
identifying the set of maximal matching phrases based on the remaining records in each of the first list of records and the second list of records.

10. The method of claim 8, where scoring the maximal matching phrases set further comprises:
summing logarithms of calculated probabilities of finding each phrase, in the maximal matching phrases set.

11. The method of claim 1, where comparing the text of the document to the content of each of the plurality of metadata records further comprises:
identifying selected words or phrases in the text of the document, where a number of the selected words or phrases in the document is less than a total number of words or phrases in the document; and
comparing the selected words or phrases to the content of each of the plurality of metadata records.

12. The method of claim 11, where identifying the selected words or phrases in the document further comprises:
generating a list of words or phrases in the document;
calculating, for each word or phrase in the document and as the second probability, a probability of finding the word or phrase in a randomly selected one of a plurality of documents;
calculating a maximum possible score for each word or phrase in the document based on the calculated probability of finding the word or phrase in a randomly selected one of the plurality of documents;
sorting the list of words or phrases, in decreasing order, based on the maximum possible scores; and
traversing down the sorted list to identify the selected words or phrases in the document.

13. The method of claim 12, further comprising:
determining whether a score has been calculated for a top-most word or phrase in the sorted list of words or phrases;
selecting the top-most word or phrase as a selected word or phrase when the score has been calculated for the top-most word or phrase;
removing the top-most word or phrase from the sorted list;
determining whether a particular total number of selected words or phrases has been selected from the list of words or phrases in the document; and
when the total number of selected words or phrases have not been selected from the list of words or phrases in the document:
determining whether the score has been calculated for a remaining top-most word or phrase in the sorted list of words or phrases,
selecting the remaining top-most word or phrase as a selected word or phrase when the score has been calculated for the remaining top-most word or phrase, and
removing the remaining top-most word or phrase from the sorted list.

14. The method of claim 13, further comprising:
calculating the score for the top-most word or phrase in the sorted list in response to determining that the score has not been calculated for the top-most word or phrase in the sorted list;
replacing the maximum possible score for the top-most word or phrase in the sorted list with the calculated score;
re-sorting the list of words or phrases based on the calculated score for the top-most word or phrase in the sorted list; and
determining whether the score has been calculated for a top-most word or phrase in the re-sorted list of words or phrases.

15. The method of claim 14, where calculating the score for the top-most word or phrase in the sorted list further comprises:
calculating a probability of finding the top-most word or phrase in a randomly selected one of the plurality of plurality of documents;
calculating a probability of finding the top-most word or phrase in a randomly selected one of the plurality of metadata records; and
calculating the score, for the top-most word or phrase, based on:

calculating the probability of finding the top-most word or phrase in a randomly selected one of the plurality of documents, and calculating the probability of finding the top-most word or phrase in a randomly selected one of the plurality of metadata records.

16. The method of claim 15, further comprising:

determining that the listing of words or phrases includes a sub-phrase of the top-most word or phrase; and re-calculating the maximum possible score for the identified sub-phrase based on the probability of finding the top-most word or phrase in a randomly selected one of the plurality of metadata records, where re-sorting the list of words or phrases is further based on re-calculating the maximum possible score for the identified sub-phrase.

17. The method of claim 15, further comprising:

determining that the top-most word or phrase does not occur in at least a particular number of the plurality of metadata records; and removing the top-most word or phrase from the list of words or phrases in response to determining that the top-most word or phrase does not occur in at least the particular number of the plurality of metadata records.

18. The method of claim 1, where storing the association between the document and the particular number of the highest ranking ones of the selected metadata records further comprises:

storing a link to the text of the document in the plurality of metadata records.

19. The method of claim 1, where storing the association between the document and the particular number of the highest ranking ones of the selected metadata records further-comprises:

storing a portion of the text of the document in the plurality of metadata records.

20. A system, comprising:

one or more processors to:

capture an image of a document;

recognize, based on the image, text of the document;

compare the text of the document to content of each of a plurality of metadata records associated with a plurality of captured documents that differ from the document;

identify sets of matching phrases that occur in both the text of the document and the content of one or more of the metadata records;

calculate a probability of finding each phrase in the set of matching phrases in the plurality of captured documents;

calculate a probability of finding each phrase in the set of matching phrases in the plurality of metadata records;

score each set of matching phrases based on the calculated probability of finding each of the phrases, in the set of matching phrases, in the plurality of captured documents, and the calculated probability of finding each of the phrases in the set of matching phrases in the plurality of metadata records; and link at least one selected metadata record, from the plurality of metadata records, to the document based on the scoring of the sets of matching phrases.

21. The system of claim 20, where the one or more processors, when identifying the sets of matching phrases, are further to:

identify sets of maximal matching phrases, where none of the maximal matching phrases, in one of the sets of maximal matching phrases, is a sub-phrase of another of the maximal matching phrases in the one of the sets of maximal matching phrases.

22. A system, comprising:

a first memory to store metadata records;

a second memory to store text of at least one page of a document; and a processor to:

identify sets of matching phrases included in both the text of the at least one page of the document and the stored metadata records, where each of the sets of matching phrases is associated with one of the metadata records, score each of the sets of matching phrases based on probabilities of each of the matching phrases, included in the respective set of matching phrases, appearing, respectively, in a randomly selected one of the stored metadata records and in a randomly selected one of a plurality of documents associated with the stored metadata records, where the plurality of documents differ from the document, select at least one of the stored metadata records, associated with the sets of matching phrases, based on the scoring of each of the sets of matching phrases, and store information to associate the document with the at least one selected metadata record in the first memory or the second memory.

23. The system of claim 22, where each of the sets of matching phrases:

includes maximal phrases, and does not include sub-phrases of the maximal phrases included in the respective one of the sets of matching phrases.

24. The system of claim 22, further comprising:

a document capture system to:

perform optical character recognition on an image of the document to recognize text of the document, and extract the text of the at least one page of the document from the text of the document.

25. A non-transitory computer-readable memory device that stores instructions executable by at least one processor, the computer-readable memory device comprising:

one or more instructions for receiving text of a document;

one or more instructions for identifying a particular page of the document based on the text of the document;

one or more instructions for identifying one or more of a plurality of metadata records, based on a comparison between text of the particular page and information in the plurality of metadata records;

one or more instructions for scoring each of the identified metadata records based on probabilities of one or more common phrases, that appear in both the text of the document and content of the respective identified metadata record, also appearing, respectively, in a randomly selected one of the plurality of metadata records and in a randomly selected one of a plurality of documents associated with the plurality of metadata records, where the plurality of documents differ from the document;

one or more instructions for selecting at least one highest scoring identified metadata record of the identified metadata records; and one or more instructions for associating, based on the scoring, the selected at least one of the identified metadata records with the document.

26. The non-transitory computer-readable memory device of claim 25, where the one or more instructions for identifying the one or more of the plurality of metadata records comprises:
- one or more instructions for identifying words and phrases in the text of document;
- one or more instructions for comparing the identified words and phrases, in the text of the document, to each of the plurality of metadata records;
- one or more instructions for choosing at least one of the plurality of metadata records, where each of the chosen metadata records includes at least one of the words and phrases identified in the text of the document; and
- one or more instructions for identifying one or more of the words or phrases occurring for each of the chosen metadata records.

27. The non-transitory computer-readable memory device of claim 26, where one or more instructions for scoring each of the identified metadata records includes:
- one or more instructions for counting occurrences, of each of the identified words and phrases, in the plurality of documents;
- one or more instructions for counting occurrences, of each of the identified words and phrases, in the plurality of metadata records;
- one or more instructions for calculating, for each of the identified words and phrases, a probability of finding the one of the identified words and phrases in a randomly selected one of the documents in the plurality of documents;
- one or more instructions for calculating, for each of the identified words and phrases, a probability of finding the one of the identified words and phrases in a randomly selected one of the plurality of metadata records; and
- one or more instructions for scoring one of the identified words and phrases based on the probability of finding the one of the identified words and phrases in the randomly selected one of the documents in the plurality of documents and based on the probability of finding the one of the identified words and phrases in the randomly selected one of the plurality of metadata records.

28. The non-transitory computer-readable memory device of claim 25, where the one or more instructions for identifying the one or more of the plurality of metadata records comprises:
- one or more instructions for identifying selected words or phrases in the document, where a number of the selected words or phrases in the document is less than a total number of words or phrases in the document,
- where the one or more instructions for identifying the selected words or phrases in the document includes:
  - one or more instructions for generating a list of words or phrases in the document,
  - one or more instructions for calculating, for each word or phrase in the document, a probability of finding the word or phrase in a randomly selected one of a plurality of documents that differ from the document,
  - one or more instructions for calculating a maximum possible score for each word or phrase in the document based on the calculated probability of finding the word or phrase in the randomly selected one of the plurality of documents,
  - one or more instructions for sorting the list of words or phrases, in decreasing order, based on the maximum possible scores, and
  - one or more instructions for traversing down the sorted list to identify the selected words or phrases in the document; and
- one or more instructions for comparing the selected words or phrases to information in the plurality of metadata records.

29. The non-transitory computer-readable memory device of claim 28, where the one or more instructions for traversing down the sorted list to identify the selected words or phrases in the document includes:
- one or more instructions for selecting a particular number of top-most words or phrases in the sorted list of words or phrases, where the one or more instructions for selecting the particular number of top-most words or phrases includes:
  - one or more instructions identifying one or more of the particular number of top-most words or phrases for which an actual score has not been calculated,
  - one or more instructions for recalculating the score for the one or more of the particular number of top-most words or phrases for which a score has not been calculated,
  - one or more instructions for re-sorting the list based on recalculating, and
  - one or more instructions for selecting the particular number of top-most words or phrases in the re-sorted list of words or phrases.

30. The non-transitory computer-readable memory device of claim 29, where the one or more instructions for recalculating the score comprises:
- one or more instructions for determining whether the list of words or phrases includes a sub-phrase of the top-most word or phrase; and
- one or more instructions for re-calculating the maximum possible score for the identified sub-phrase based on the probability of finding the top-most word or phrase in a randomly selected one of the plurality of metadata records.

* * * * *